United States Patent
Yoon et al.

(10) Patent No.: US 9,756,365 B2
(45) Date of Patent: Sep. 5, 2017

(54) BROADCAST RECEPTION DEVICE, OPERATING METHOD OF BROADCAST RECEPTION DEVICE, CONDITIONAL ACCESS MODULE AND OPERATING METHOD OF CONDITIONAL ACCESS MODULE

(71) Applicant: LG ELECTRONICS INC., Seoul (KR)

(72) Inventors: Joonhee Yoon, Seoul (KR); Kyounghwan Kim, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 14/796,670

(22) Filed: Jul. 10, 2015

(65) Prior Publication Data
US 2016/0014436 A1    Jan. 14, 2016

Related U.S. Application Data

(60) Provisional application No. 62/023,186, filed on Jul. 11, 2014.

(51) Int. Cl.
*H04N 21/235* (2011.01)
*H04N 21/418* (2011.01)
*H04N 21/4367* (2011.01)

(52) U.S. Cl.
CPC ..... *H04N 21/2351* (2013.01); *H04N 21/4181* (2013.01); *H04N 21/4367* (2013.01)

(58) Field of Classification Search
CPC ........... H04N 21/2351; H04N 21/4181; H04N 21/4367; H04N 21/418; H04N 21/266; H04N 21/26606; H04N 21/4623; H04N 21/4182; G06F 21/30; G06F 21/44; G06F 21/70; G06F 21/33; G06F 21/34;
(Continued)

(56) References Cited

U.S. PATENT DOCUMENTS

| | | |
|---|---|---|
| 2007/0177733 A1 | 8/2007 | Wajs |
| 2010/0269129 A1 | 10/2010 | Lim |
| 2012/0278610 A1 | 11/2012 | Waller |

(Continued)

FOREIGN PATENT DOCUMENTS

| | | |
|---|---|---|
| GB | 2501759 A | 11/2013 |
| WO | WO 2013/164566 A1 | 11/2013 |

OTHER PUBLICATIONS

EBU DVB, DVB extension to CI Plus specification ESTI TS 103205, Mar. 2014, ESTI, V1.1.1, p. 9, 15-16, 21-22, 29-30, 32-34.*

(Continued)

*Primary Examiner* — Rong Le
(74) *Attorney, Agent, or Firm* — Birch, Stewart, Kolasch & Birch, LLP

(57) ABSTRACT

A broadcast reception device is provided. The broadcast reception device includes a broadcast reception unit receiving a broadcast signal comprising scrambled content, and a control unit transmitting a first data unit and receiving a second data unit, wherein the first data unit comprises a request for information on the number of devices that play the scrambled content simultaneously with the broadcast reception device and the second data unit comprises a reply to the first data unit.

19 Claims, 24 Drawing Sheets

(58) Field of Classification Search
CPC ....... G06F 21/123; H04L 63/08; H04L 63/10; H04L 63/0823; H04L 9/3263; H04L 63/0853
See application file for complete search history.

(56) References Cited

U.S. PATENT DOCUMENTS

2014/0164565 A1  6/2014  Sato et al.
2015/0058878 A1  2/2015  Hill-Jowett

OTHER PUBLICATIONS

ETSI, "Digital Video Broadcasting (DVB); Extensions to the CI Plus (TM) Specification Technical Specification", EBU Operating Eurovision, Mar. 2014, pp. 1-154.

* cited by examiner

FIG.3a

```
/*********************************
List of APDU_TAG: 24 bit
*********************************/
/* pResource Manager object */
#define    PROFILE_ENQUIRY              0x9f8010
#define    PROFILE_REPLY                0x9f8011
define    PROFILE_CHANGED              0x9f8012 ifdef     _CI_EXTENSION_RESOURCE
define    MODULE_ID_SEND               0x9f8013
#define    MODULE_ID_COMMAND            0x9f8014
ifdef /* Application Infomation */
define    APPLICATION_INFO_ENQ         0x9f8020
#define    APPLICATION_INFO             0x9f8021
#define    ENTER_MENU                   0x9f8022

/* CA_Support */
#define    CA_INFO_ENQ                  0x9f8030
#define    CA_INFO                      0x9f8031
#define    CA_PMT                       0x9f8032
#define    CA_PMT_REPLY                 0x9f8033
```

FIG.3b

```
/* Man-Machine Interface */ define   CLOSE_MMI                0x9f8800
define   DISPLAY_CONTROL          0x9f8801
#define   DISPLAY_REPLY            0x9f8802
#define   TEXT_LAST                0x9f8803
#define   TEXT_MORE                0x9f8804
#define   KEYPAD_CONTROL           0x9f8805
#define   KEYPRESS                 0x9f8806
#define   ENQ                      0x9f8807
#define   ANSW                     0x9f8808
#define   MENU_LAST                0x9f8809
#define   MENU_MORE                0x9f880A
#define   MENU_ANSW                0x9f880B
#define   LIST_LAST                0x9f880C
#define   LIST_MORE                0x9f880D
#define   SUBTITLE_SEGMENT_LAST    0x9f880E
#define   SUBTITLE_SEGMENT_MORE    0x9f880F
#define   DISPLAY_MESSAGE          0x9f8810
#define   SCENE_END_MARK           0x9f8811
#define   SCENE_DONE               0x9f8812
#define   SCENE_CONTROL            0x9f8813
#define   SUBTITLE DOWNLOAD LAST   0x9f8814
```

FIG.3c

```
/* DateTime_Support */
#define   DATE_TIME_ENQ              0x9F8440
#define   DATE_TIME_REPLY            0x9F8441

/* HostControl_Support */
#define   TUNE                       0x9f8400
#define   REPLACE                    0x9f8401
#define   CLEAR_REPLACE              0x9f8402
#define   ASK_RELEASE                0x9f8403
```

FIG.4

| APDU Tag | Tag value (3 bytes) | Description | Direction CAM | Direction Host | Protocol |
|---|---|---|---|---|---|
| cc_open_req | 9F 90 01 | BITMASK REQUEST OF CC SYSTEM ID THAT HOST SUPPORTS | -> | | Host capability evaluation |
| cc_open_cnf | 9F 90 02 | BITMASK REPLY OF CC SYSTEM ID | | <- | Host capability evaluation |
| cc_data_req | 9F 90 03 | DATA TRANSMISSION REQUEST BETWEEN HOST AND CAM AND NOT ENCRYPTED | -> | | Authentication Auth key verification SAC key calculation |
| cc_data_cnf | 9F 90 04 | DATA TRANSMISSION REPLY BETWEEN HOST AND CAM AND NOT ENCRYPTED | | <- | Authentication Auth key verification SAC key calculation |
| cc_sync_req | 9F 90 05 | SIGNAL NOTIFYING THAT IT IS READY TO USE NEWLY CALCULATED KEY | -> | | SAC key calculation |
| cc_sync_cnf | 9F 90 06 | SIGNAL REPLY NOTIFYING THAT IT IS READY TO USE NEWLY CALCULATED KEY | | <- | SAC key calculation |
| cc_sac_data_req | 9F 90 07 | DATA TRANSMISSION REQUEST BETWEEN HOST AND CAM, ENCRYPTED AND AUTHENTICATION NEEDED | -> | | CC key calculation URI transmission and acknowledgement URI version negotiation SRM transmission and ACK Content license exchange |
| cc_sac_data_cnf | 9F 90 08 | DATA TRANSMISSION REPLY BETWEEN HOST AND CAM, ENCRYPTED AND AUTHENTICATION NEEDED | | <- | CC key calculation URI transmission and acknowledgement URI version negotiation SRM transmission and ACK Content license exchange |
| cc_sac_sync_req | 9F 90 09 | SIGNAL NOTIFYING THAT IT IS READY TO USE NEWLY CALCULATED KEY, AND ENCRYPTED | -> | | CC key calculation |
| cc_sac_sync_cnf | 9F 90 10 | SIGNAL REPLY NOTIFYING THAT IT IS READY TO USE NEWLY CALCULATED KEY, AND ENCRYPTED | | <- | CC key calculation |

FIG.8

| Field | Number of bits | Mnemonic |
|---|---|---|
| uri_message() { | | |
|     protocol_version | 8 | uimsbf |
|     aps_copy_control_info | 2 | uimsbf |
|     emi_copy_control_info | 2 | uimsbf |
|     ict_copy_control_info | 1 | uimsbf |
|     if(emi_copy_control_info == 00) { | | |
|         rct_copy_control_info | 1 | uimsbf |
|     } | | |
|     else { | | |
|         reserved = 0 | 1 | uimsbf |
|     } | | |
|     reserved for future use | 1 | uimsbf |
|     if(emi_copy_control_info == 11) { | | |
|         dot_copy_control_info | 1 | uimsbf |
|         rl_copy_control_info | 8 | uimsbf |
|     } | | |
|     else { | | |
|         reserved = 0x00 | 9 | uimsbf |
|     } | | |
|     if(emi_copy_control_info == 10) { | | |
|         trick_mode_control_info | 1 | uimsbf |
|     } | | |
|     else { | | |
|         reserved = 0 | 1 | uimsbf |
|     } | | |
|     reserved for future use | 39 | uimsbf |
| } | | |

FIG.9

| Field | Default Initial Value |
|---|---|
| protocol version | 0x03 |
| emi_copy_control_info | 0b11 |
| aps_copy_control_info | 0b00 |
| ict_copy_control_info | 0b0 |
| rct_copy_control_info | 0b0 |
| dot_copy_control_info | 0b0 |
| rl_copy_control_info | 0b00000000 |
| trick_mode_control_info | 0b0 |
| reserved bits | 0b0 |

FIG.10

| Field | No. of bits | Mnemonic |
|---|---|---|
| uri_message (){ | | |
|     protocol_version | 8 | uimsbf |
|     emi_copy_control_info | 2 | |
|     aps_copy_control_info | 2 | uimsbf |
|     ict_copy_control_info | 1 | uimsbf |
|     numerical_output_control_info | 4 | uimsbf |
|     if (emi_copy_control_info==00){ | | uimsbf |
|         rct_copy_control_info | 1 | uimsbf |
|     } | | uimsbf |
|     else { | | |
|         reserved=0 | 1 | uimsbf |
|     } | | |
|     reserved for future use | 1 | uimsbf |
|     if (emi_copy_control_info==11){ | | |
|         dot_copy_control_info | 1 | uimsbf |
|         rl_copy_control_info | 8 | uimsbf |
|     } | | |
|     else { | | |
|         reserved=0x00 | 9 | uimsbf |
|     } | | |
|     if (emi_copy_control_info==10){ | | |
|         trick_mode_control_info | 1 | uimsbf |
|     } | | |
|     else { | | |
|         reserved=0 | 1 | uimsbf |
|     } | | |
|     reserved for future use | 35 | |
| } | | |

FIG.11

| Contents | Value | Comment |
|---|---|---|
| 0x0 | b0000 | No additional output allowed. (The Host shall not output any additional CI Plus controlled content simultaneously). |
| 0x01 | b0001 | One additionaloutput allowed. (The Host may output one additional CI Plus controlled content simultaneously to clients). |
| 0x2~0xE | b0010~b1110 | 2~14 additional outputs allowed. (The Host may output 2~14 additional CI Plus controlled content simultaneously to clients). |
| 0xF | b1111 | Unlimited additional outputs allowed. |

FIG.12

| Field | Default Initial Value |
|---|---|
| protocol_version | 0x04 |
| emi_copy_control_info | 0b11 |
| aps_copy_control_info | 0b00 |
| ict_copy_control_info | 0b0 |
| numerical_output_control_info | 0b0000(4bits) |
| rct_copy_control_info | 0b0 |
| dot_copy_control_info | 0b0 |
| rl_copy_control_info | 0b00000000 |
| trick_mode_control_info | 0b0 |
| reserved bits | 0b0 |

FIG.13

| APDU Tag | Tag value (3 bytes) | Description | Direction | | Protocol |
|---|---|---|---|---|---|
| | | | CAM | Host | |
| cc_open_req | 9F 90 01 | BITMASK REQUEST OF CC SYSTEM ID THAT HOST SUPPORTS | -> | | Host capability evaluation |
| cc_open_cnf | 9F 90 02 | BITMASK REPLY OF CC SYSTEM ID | <- | | Host capability evaluation |
| ... | ... | ... | | | ... |
| cc_output_capabilities_req | 9F 90 18 | REQUEST FOR NUMBER OF DEVICES THAT MAY PLAY CONTENT TO WHICH CI PLUS HAS BEEN APPLIED, SIMULTANESOULY WITH HOST | <- | | Host requests output capabilities of CICAM |
| cc_output_capabilities_reply | 9F 90 19 | REPLY TO REQUEST FOR NUMBER OF DEVICES THAT MAY PLAY CONTENT TO WHICH CI PLUS HAS BEEN APPLIED, SIMULTANESOULY WITH HOST | -> | | CICAM output capabilities reply |

FIG.14

| Syntax | No. of bits | Mnemonic | Direction |
|---|---|---|---|
| cc_output_capabilities_req(){ | | | CAM <- Host |
|     cc_output_capabilities_req_tag | 24 | uimsbf | |
|     length_field()=0 | | | |
| } | | | |

FIG.15

| Syntax | No. of bits | Mnemonic | Direction |
|---|---|---|---|
| cc_output_capabilities_reply(){ | | | CAM -> Host |
|     cc_output_capabilities_reply_tag | 24 | uimsbf | |
|     length_field() | | | |
|     numerical_output() | 8 | uimsbf | |
| } | | | |

FIG.17

| Step | Action | APDU | Content | | | |
|---|---|---|---|---|---|---|
| 1 | Host requests the number of additional output devices from the CAM | cc_sac_data_req | request_datatype_nbr=1 | | | |
| | | | i | datatype_id | | |
| | | | 0 | 51(numerical_output) | | |
| 2 | CAM sends the number of additional output devices to the Host | cc_sac_data_cnf | send_datatype_nbr=1 | | | |
| | | | i | datatype_id | | datatype_len |
| | | | 0 | 51(numerical_output) | | 8 bits |

FIG.18

| Key or variable | Size (bits) | Comments | datatype id |
|---|---|---|---|
| Reserved | - | - | 1 |
| ⋮ | ⋮ | ⋮ | |
| HOST_ID | 64 | Generated by the ROT and included in the X.509 certificate | 5 |
| CICAM_ID | 64 | Generated by the ROT and included in the X.509 certificate | 6 |
| ⋮ | ⋮ | ⋮ | ⋮ |
| Reserved | - | - | 49 |
| LTS_id | 8 | Local TS Identifier | 50 |
| numerical_output | 8 | the number of allowed additional outputs | 51 |

FIG.20 cc_sac_data_req APDU syntax

| Syntax | No.of bits | Mnemonic | Description |
|---|---|---|---|
| cc_sac_data_req(){ | | | |
| cc_sac_data_req_tag | 24 | uimsbf | req APDU tag value |
| length_field() | | | Length |
| sac_message() | 8 | uimsbf | PAYLOAD ACCORDING TO SAC FORMAT |
| } | | | | cc_sac_data_req payload

| Syntax | No.of bits | Mnemonic | Description |
|---|---|---|---|
| request_datatype_nbr | 24 | uimsbf | DATATYPE REQUEST NUMBER |
| for (i=0;i<request_datatype_nbr;i++) { | | | |
| datatype_id | 8 | uimsbf | NEWLY DEFINED DATATYPE_ID TRANSMISSION ->numerical_output(51) |
| } | | | |

FIG.21 cc_sac_data_cnf APDU syntax

| Syntax | No.of bits | Mnemonic | Description |
|---|---|---|---|
| cc_sac_data_cnf(){ | | | |
|   cc_sac_data_cnf_tag | 24 | uimsbf | cnf APDU tag value |
|   length_field() | | | Length |
|   sac_message() | 8 | uimsbf | PAYLOAD ACCORDING TO SAC FORMAT |
| } | | | | cc_sac_data_cnf payload

| Syntax | No.of bits | Mnemonic | Description |
|---|---|---|---|
| send_datatype_nbr | 24 | uimsbf | DATATYPE TRANSMISSION NUMBER |
| for (i=0;i<send_datatype_nbr;i++) { | | | |
|   datatype_id | 8 | uimsbf | numerical_output (51) 8bits |
|   datatype_length | 16 | uimsbf | |
|   data_type | 8*datatype_length | bslbf | |
| } | | | |

BROADCAST RECEPTION DEVICE, OPERATING METHOD OF BROADCAST RECEPTION DEVICE, CONDITIONAL ACCESS MODULE AND OPERATING METHOD OF CONDITIONAL ACCESS MODULE

CROSS REFERENCE TO RELATED APPLICATIONS

This non-provisional application claims the benefit under 35 U.S.C. §119(e) to U.S. Provisional Application No. 62/023,186, filed on Jul. 11, 2014, all of which are hereby expressly incorporated by reference into the present application.

BACKGROUND

The present disclosure relates to a broadcast reception device, an operating method of a broadcast reception device, a conditional access module and an operating method of a conditional access module.

A broadcaster scrambles content in order to provide the content to only viewers who paid license fee and then transmits scrambled content, and a broadcast reception device descrambles the scrambled content and then provides the descrambled content to a viewer. Such a broadcasting system is referred to as a conditional access system (CAS). The particular operating method of the CAS varies according to a CAS provider providing the CAS. Thus, in order for the broadcast reception device to provide a CAS from a specific provider, the broadcast reception device should implement both particular functions and operating methods that a corresponding provider requires. Also, there is a need to obtain, from the corresponding provider, certification that operations required by the corresponding provider are all performed. Thus, it is difficult for the broadcast reception device to provide CASs from many providers. In order to solve such a limitation, a conditional access module (CAM) and a common interface (CI) are used.

The CAM is a module descrambling broadcast content scrambled according to the CAS of an individual provider. The CI is an interface through which the broadcast reception device and the CAM are connected. When the broadcast reception device includes a CI slot to which the CAM is connected, a user may connect, to the CI slot, the CAM that may descramble broadcast content to be viewed. Accordingly, the broadcast reception device may implement only the CI capable of being linked to the CAM without a need to implement all operations required by the CAM of an individual provider, descramble scrambled broadcast content and provide the descrambled content to a viewer.

In general, an interface among a computer, a machine, a system and a man using them is referred to as a man machine interface (MMI). The MMI includes all of visual, auditory, and tactile ones. Also, the MMI interface includes computer control commands, communication technologies, or physical elements that may operate the computer. Also, the MMI may include an input device and an output device in addition to a graphic user interface (GUI).

Such a MMI may link the CAM to the man. In particular, the MMI may be a specific screen for receiving a user input. In this case, it is possible to identify the MMI according to who determines the display method of the MMI. Particular embodiments are described below.

SUMMARY

Embodiments provide a broadcast reception device that controls the number of external devices playing scrambled content simultaneously with the broadcast reception device, an operating method of a broadcast reception device, a conditional access module and an operating method of a conditional access module.

In one embodiment, a broadcast reception device connected to a conditional access module (CAM) descrambling scrambled broadcast content includes a broadcast reception unit receiving a broadcast signal including scrambled content; and a control unit transmitting a first data unit and receiving a second data unit, wherein the first data unit includes a request for information on the number of devices that play the scrambled content simultaneously with the broadcast reception device and the second data unit includes a reply to the first data unit.

The first data unit and the second data unit may conform to a protocol for information on the number of devices that play the scrambled content simultaneously with the broadcast reception device.

The first data unit and the second data unit may include information representing data units conforming to the protocol for information on the number of devices.

The second data unit may include the number of devices that play scrambled content different from the scrambled content played by the reception device, simultaneously with the broadcast reception device.

Messages for information transmission in the first data unit and the second data unit may be encrypted or authenticated messages.

The first data unit and the second data unit may include objects for information on the number of devices that play the scrambled content simultaneously with the broadcast reception device.

The information on the number of devices playing the scrambled content that is included in the second data unit may be at least one of information representing that only the broadcast reception device plays scrambled content, information representing that one or more limited devices play scrambled content, and information representing that there is no limitation on the playback of scrambled content.

The first data unit may include usage rule information (URI) for a request for information on the number of devices that play scrambled content simultaneously with the broadcast reception device, and the second data unit may include an URI message for a reply to the request for the information on the number of devices that play scrambled content simultaneously with the broadcast reception device.

The URI message may include at least one of information representing that only the broadcast reception device plays scrambled content, information representing that one or more limited devices play scrambled content, and information representing that there is no limitation on the playback of scrambled content.

The control unit may transmit and receives to and from the CAM a third data unit for a session open for transmitting/receiving the first data unit and the second data unit.

In another embodiment, an operating method of a broadcast reception device connected to a CAM descrambling scrambled broadcast content includes receiving a broadcast signal including scrambled content; transmitting a first data unit including a request for information on the number of devices that play the scrambled content simultaneously with the broadcast reception device; and receiving a second data unit including a reply to the first data unit.

In further another embodiment, a CAM transmits a data unit including information on the number of devices that play scrambled content simultaneously with the broadcast reception device.

The details of one or more embodiments are set forth in the accompanying drawings and the description below. Other features will be apparent from the description and drawings, and from the claims.

BRIEF DESCRIPTION OF THE DRAWINGS

The accompanying drawings that are included in order for readers to help to more easily understand the present disclosure, included in the present application and configure part thereof represent embodiments of the present disclosure along with the detailed description describing the principle of the present disclosure.

FIGS. 2 to 3c are diagrams for schematically explaining resources that a CAM and a broadcast reception device according to an embodiment transmit and receive.

FIG. 4 is a diagram for explaining an embodiment of a resource.

FIG. 8 shows the syntax of URI according to another embodiment.

FIG. 9 shows the default value of URI according to another embodiment.

FIG. 10 shows the syntax of URI according to another embodiment.

FIG. 11 shows a value that information on the number of devices that may play scrambled content may have according to another embodiment.

FIG. 12 shows the default value of information that URI includes according to another embodiment.

FIG. 13 shows an object that a resource for content control includes according to another embodiment.

FIGS. 14 to 15 show the syntax of a data unit according to an embodiment of FIG. 13.

FIGS. 17 and 18 show a protocol for transmitting information on the number of devices that play scrambled content according to an embodiment.

FIGS. 19 to 21 show a protocol for transmitting information on the number of devices that play scrambled content according to an embodiment.

DETAILED DESCRIPTION OF THE EMBODIMENTS

Exemplary embodiments are particularly described and examples are represented in the accompanying drawings. The following detailed description provided with reference to the accompanying drawings is to describe exemplary embodiments rather than to represent only embodiments that may be implemented according to embodiments. The following detailed description includes details in order to provide thorough understanding of the present disclosure. However, it is obvious to a person skilled in the art that the present disclosure may be implanted without these details.

Although most of the terms used herein are selected among general terms widely used in a corresponding field, some terms are arbitrarily selected by the applicant and their meanings are described in detail in the following description as necessary. Thus, the present disclosure should be understood based on the intended meaning of a term, not on the meaning of the simple name or meaning of the term.

Figure 1:
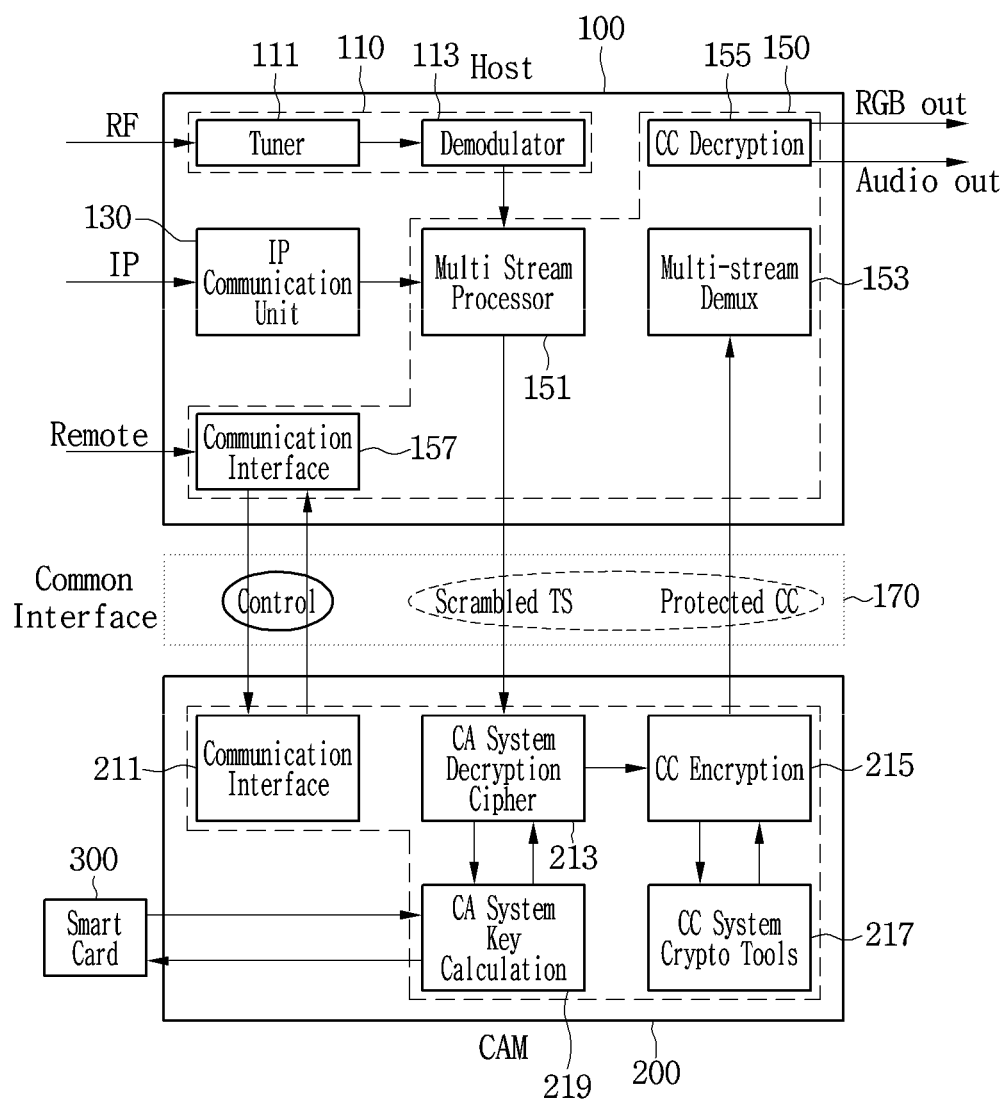
FIG. 1 represents the structures of a broadcast reception device and a conditional access module (CAM) according to an embodiment.

FIG. 1 represents the structures of a broadcast reception device and a conditional access module (CAM) according to an embodiment.

A broadcast reception device 100 according to the embodiment includes a broadcast reception unit 110, an internet protocol (IP) communication unit 130, a control unit 150, a common interface (CI) slot 170, and an output unit (not shown).

The broadcast reception unit 110 receives and demodulates a broadcast signal. In particular, the broadcast reception unit 110 may include a tuner 111 receiving the broadcast signal. Also, the broadcast reception unit 110 may include a demodulator 113 demodulating the broadcast signal.

The IP communication unit 130 receives and transmits IP data.

The control unit 150 controls the operation of the broadcast reception device 100. In particular, the control unit 150 may include a multi-stream processor 151 that controls a multi-stream input to the CAM. Also, the control unit 150 may include a multi-stream demux 153 that de-multiplexes each stream from multiple streams that have been descrambled. Also, the control unit 150 may include a contents control (CC) decryption unit 155 that decrypts broadcast content encrypted for content protection. The CC decryption unit 155 may decrypt the encrypted broadcast content based on a unique key value allocated to the broadcast reception device 100. Also, the control unit 150 may include a communication interface unit 157 that transmits the control command of the broadcast reception device 100 to the CAM and receives a reply to the control command from the CAM.

The CI slot 170 connects the broadcast reception device 100 and the CAM 200. In particular, the broadcast reception device 100 may transmit a control command and a scrambled broadcast stream through the CI slot and receive a reply to the control command and a broadcast stream obtained by encrypting the descrambled broadcast stream. In an embodiment, the CI slot 170 may be any one of standard PC memory card international association (PCMCIA) and universal serial bus (USB).

The CAM 200 according to an embodiment includes a control unit 210. In particular, the control unit 210 controls the operation of the CAM. In particular, the control unit 210 receives a scrambled broadcast stream from the broadcast reception device 100 and descrambles the received stream. In particular, the control unit 210 may include a communication interface 211 that receives a control command from the broadcast reception device 100 and transmits a reply to the control command. The communication interface unit 211 of the CAM 200 may interact through the CI with the communication interface 157 of the broadcast reception device 100. In this case, the CI may be a communication protocol between the broadcast reception device and the CAM. In a particular embodiment, the broadcast reception device 100 and the CAM 200 may control the interaction of an application in operation through the communication interface unit.

Also, the control unit 210 may include a CAS key calculation unit 219 that obtains a control word (CW) based on a broadcast stream. In this case, the CW represents a key needed for descrambling scrambled broadcast content. In particular, the CAS key calculation unit 219 may extract an entitlement control message (ECM) from a broadcast stream to transmit it to a smart card 300, and obtain a CW from the smart card 300.

Also, the control unit 210 may include a CAS decryption cipher 213 that descrambles scrambled broadcast content by using the obtained CW. Also, the control unit 210 may include a CC encryption unit 251 that encrypts descrambled broadcast content in order to prevent the descrambled broadcast content from becoming leaked. In a particular embodiment, the CC encryption unit 251 may obtain a key value for encryption from the CAS decryption cipher 213 to encrypt descrambled broadcast content. In this case, the key value for encryption may be a unique key value allocated to a corresponding CAM.

The CAM 300 may extract usage rule information (URI) from a broadcast stream. The URI is a content usage rule designated by at least any one of a content provider and a content distributor. In particular, the URI may represent at least one of content output and copy rules. For example, the URI may represent whether to permit the copying of content. The URI may represent the usage rule of a specific broadcast service. Also, the URI may represent the usage rule of a specific event that a broadcast service includes. Also, the URI may represent whether to permit the analog output of content. In this case, the analog output is outputting analog audio or analog video. Also, the digital output is outputting digital audio or digital video. In particular, a terminal providing the analog output may include at least one of a scart terminal, a composite terminal, and a component terminal. A terminal providing the digital output may include at least one of a high definition multimedia interface (HDMI) terminal and a Sony Philips digital interface (SP-DIF) terminal.

Figure 2:
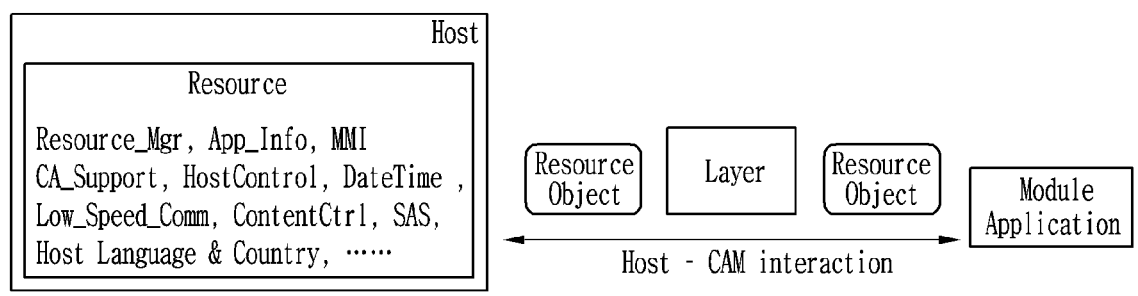

FIGS. 2 to 3c are diagrams for schematically explaining a resource that a CAM and a broadcast reception device according to an embodiment transmit and receive.

In an embodiment, the CAM 200 and the broadcast reception device 100 may transmit and receive resources through interaction. In this case, the resource may be a data unit for transmitting/receiving data on a specific function between the CAM 200 and the broadcast reception device 100. The resource may be divided according to a function. Also, the resource may include an object for transmitting/receiving data on a sub function of a function. In this case, the object is a subordinate concept of the resource and may be a data unit for identifying the sub function of the specific function. In addition, the resource may be defined according to a communication protocol between the broadcast reception device 100 and the CAM 200.

The communication protocol between the broadcast reception device 100 and the CAM 200 may include a plurality of protocol layers. In particular, the plurality of protocol layers may include a physical layer, a link layer, and an application layer. In this case, the resource may be included in the application layer, the top layer of the protocol layer.

The application layer may include a plurality of resources. Particular examples of the plurality of resources are shown in FIGS. 3a to 3c. A man machine interface (MMI) of the plurality of resources in FIGS. 3a to 3c may provide interaction including an output unit and an input unit.

In a particular embodiment, the MMI may have a plurality of embodiments according to the processing method of the broadcast reception device 100. In a first embodiment, the CAM 200 may directly control the display method of the MMI for interaction with a user. In particular, a related application installed in the CAM 200 may directly control the displaying of the MMI. The MMI method according to the first embodiment may be referred to as a low-level MMI.

In a second embodiment, the display related application of the broadcast reception device 100 may control the display method of the MMI. In particular, the broadcast reception device 100 may control the MMI in the same way as the display related application installed in the broadcast reception device 100. The MMI method according to the second embodiment may be referred to as an application MMI.

In a third embodiment, the broadcast reception device 100 may control the display method of the MMI. In particular, the broadcast reception device 100 may determine the display method of an object received from the CAM 200. The MMI method according to the third embodiment may be referred to as a high-level MMI.

FIG. 4 is a diagram for explaining an embodiment of a resource.

As described above, the resource may be identified according to a function. A resource according to an embodiment may include a resource for a security function. The resource for the security function may be referred to as a CC resource. The resource for the security function may implement a security protocol between the broadcast reception device 100 and the CAM 200. The security protocol may include at least one of authentication, key calculation, and usage rule information (URI).

As shown in FIG. 4, an object for the CC resource may include an object for requesting the bitmask of a CC system ID that the broadcast reception device 100 supports. The CC system identifier may be information for identifying a CC system that may be different according to a manufacturer. In this case, the object for requesting the bitmask of the CC system identifier may be an object that the CAM 200 transmits to the broadcast reception device 100. The bitmask of the CC system identifier may notify whether the broadcast reception device 100 supports a version of the CC resource that the CAM 200 uses when a CC session is formed.

Also, the object for the CC resource may include an object for a reply to a request for the bitmask of the CC system identifier. In this case, the object for the reply to the request for the bitmask of the CC system identifier may be an object that the broadcast reception device 100 transmits to the CAM 200.

Also, the object for the CC resource may include an object for a data transmission request. In this case, the object for the data transmission request may not be encrypted. The object for the data transmission request may be an object that the CAM 200 transmits to the broadcast reception device 100.

Also, the object for the CC resource may include an object for a reply to the data transmission request. In this case, the object for the reply to the data transmission request may not be encrypted. The object for the reply to the data transmission request may be an object that the broadcast reception device 100 transmits to the CAM 200.

Also, the object for the CC resource may include an object for the usage preparation completion signal of a newly calculated key.

Also, the object for the CC resource may include an object for a reply to the usage preparation completion signal of the newly calculated key.

Also, the object for the CC resource may include an object for a request for data that has been encrypted and needs authentication.

Also, the object for the CC resource may include an object for a reply to the request for the data that has been encrypted and needs authentication.

Also, the object for the CC resource may include an object for the usage preparation completion signal of a newly calculated key that has been encrypted.

Also, the object for the CC resource may include an object for a reply to the usage preparation completion signal of the newly calculated key that has been encrypted.

Figure 5:
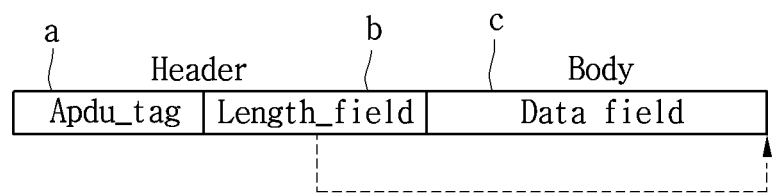
FIG. 5 represents a data unit for object transmission according to an embodiment.

FIG. 5 represents a data unit for object transmission according to an embodiment.

The object may be transmitted in the form of a data unit. In this case, the data unit may be a transmission unit that is defined according to a communication protocol between the CAM 200 and the broadcast reception device 100. The data unit for the object transmission may be referred to as an application protocol data unit (APDU). The data unit for the object transmission may include a header and a body.

The header of the data unit may include tag information for identifying an object that the data unit transmits. The tag information for identifying the object may be Apdu_tag field a. Also, the header of the data unit may include length information on information that the data unit transmits. The length information may be Length_field b.

The body of the data unit may include data field c☐. The data field may include data for implementing an object that an object represents. For example, object data may be related to the displaying of the MMI. Due to a buffer size restriction, the object transmitted through the data unit may be divided into a plurality of data units and transmitted. In this case, the tag field of the data unit may include another tag value according to included object data in an embodiment. For example, the tag field of the data unit that includes the last of object data obtained through division may include L_apdu_tag. In addition, the tag field of the data unit that includes remaining object data may include M_apdu_tag.

Figure 6:
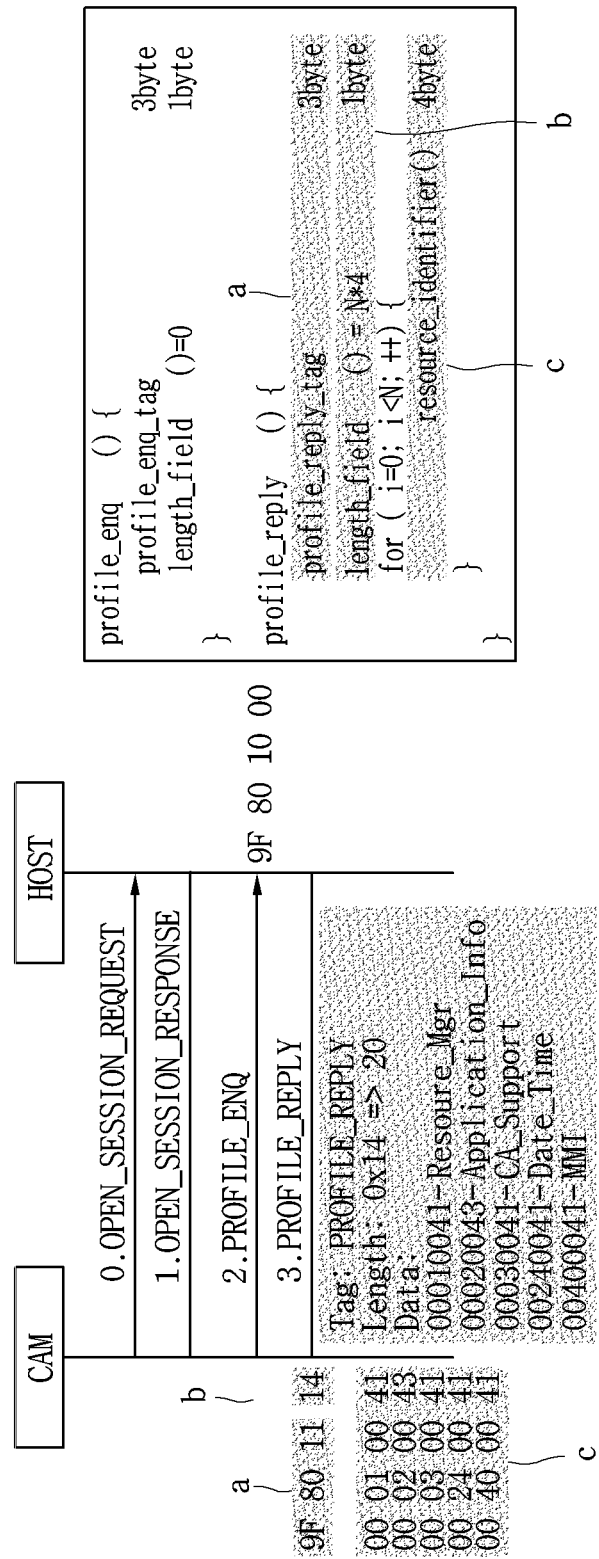
FIG. 6 represents an example of an object interaction between a broadcast reception device 100 and a CAM 200 according to an embodiment.

FIG. 6 represents an example of an object interaction between the broadcast reception device 100 and the CAM 200 according to an embodiment.

The CAM 200 initially transmits a request for session open to the broadcast reception device 100. In this case, the session may indicate a logical link for activating the connection between the CAM 200 and the broadcast reception device to transmit and receive data. When the broadcast reception device 100 receives the request form the session open, it transmits a reply to the request to the CAM. When the session is linked, the CAM 200 transmits, to the broadcast reception device 100, a request for receiving a profile input from a user. In this case, the broadcasting reception device 100 may identify the request from the CAM 200 based on tag information. The broadcast reception device 100 transmits a reply to the request from the CAM 200. Since the request from the CAM 200 is related to the profile input, the broadcast reception device 100 may transmit, to the CAM 200, the reply to the request for the profile input. In this case, the data unit that the CAM 200 receives may include matters as shown in FIG. 6. In particular, the data unit may include tag information a, length information b☐ and data information c.

Figure 7:
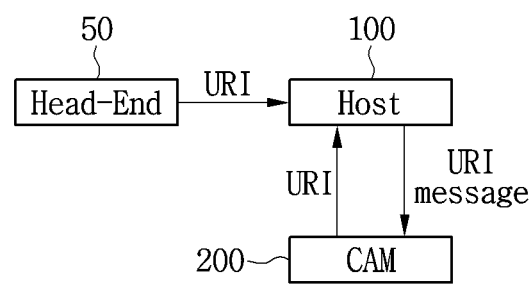
FIG. 7 shows when a CAM obtains usage rule information (URI) according to an embodiment.

FIG. 7 shows when a CAM obtains usage rule information (URI) according to an embodiment.

A CAM 200 may extract URI from broadcast stream through a control unit 210. In more detail, the CAM 200 may receive URI through an undisclosed way. In a specific embodiment, the CAM 200 may extract URI from at least one of ECMs for providing an entitlement management message (EMM) for managing the entitlement of the smart card 300 and a CW for descrambling scrambled broadcast content.

Additionally, the CAM 200 may transmit URI to the broadcast reception device 100. In more detail, the CAM 200 may transmit URI to the broadcast reception device 100 in a URI message format. Additionally, the CAM 200 may transmit a secured protocol to the broadcast reception device 100. A specific syntax of URI according to an embodiment of the present invention will be described with reference to FIG. 8.

FIG. 8 shows the syntax of URI according to another embodiment.

The URI may include protocol version information representing the protocol version of URI.

In the case of an analog output, a copy protection algorithm is limited in comparison to a digital output. Additionally, an applicable copy protection algorithm is limited. For example, a copy generation management system-analog (CGMS-A) cannot be applied to a high definition (HD) image. Accordingly, the URI may include information relating to a control of the analog output of content. Additionally, the URI may include analog protection system information representing whether to use analog copy protection applied to the analog output of content. Additionally, the URI may include encryption mode indicator information representing whether to allow the copy of content. The encryption mode indicator information may represent at least one of a case that the copy of content is not limited, a case that an additional copy of content is not allowed any more, a case that only one content copy is allowed, and a case that the copy of content is prohibited. Additionally, the URI may include image constrained trigger information representing whether to limit the quality of an analog output image of content. In a specific embodiment, the encryption mode indicator information may represent whether to allow copy, which is applied to both an analog output and a digital output. Additionally, the URI may include redistribution control information representing whether to allow the redistribution of broadcast content. Additionally, the URI may include digital only token information representing whether to prohibit the analog output of content.

Additionally, the URI may include retention period information representing the maximum retention period of record or time-shift content. In more detail, the retention period information may represent at least one of a case that content is retained for 90 min, a case that content is retained for 6 hr, a case that content is retained for 12 hr, a case that content is retained for one of 1 day to 252 days, and a case that content is retained without restriction.

Additionally, content providers or content redistributors are required to prevent advertisements, which are inserted by them, from being played at double speed and skipped by users. Accordingly, the URI may include trick mode control information representing whether a trick mode for content is limited. A trick mode is that content is played at double speed instead of a normal playback speed.

In a specific embodiment, the URI, like the embodiment of FIG. 8, may include at least one of a protocol_version field, an aps_copy_control_info field, an emi_copy_control_info field, an ict_copy_control_info field, rct_copy_control_info field, a dot_copy_control_info field, a rl_copy_control_info field, and a trick_mode_control_info field.

The protocol_version field represents protocol version information representing the protocol version of URI. In a specific embodiment, the protocol_version field may be an 8-bit field. In a specific embodiment, the CAM 200 may transmit a URI message to the broadcast reception device 100 on the basis of the protocol version of URI that the broadcast reception device 100 supports. For example, when the broadcast reception device 100 supports the protocol version of the current reception URI, the CAM 200 may transmit a URI message to the broadcast reception device 100.

The aps_copy_control_info field represents analog protection system information representing whether to use analog copy protection applied to the analog output of content. The aps_copy_control_info field may represent not using an analog copy protection system. At this point, a value of the aps_copy_control_info field may be 0x0. The aps_copy_control_info field may represent using an analog copy protection system and not using a split bust function. At this point, a value of the aps_copy_control_info field may be 0x1. The aps_copy_control_info field may represent using an analog copy protection system and using a split bust function through two lines. At this point, a value of the aps_copy_control_info field may be 0x2. The aps_copy_control_info field may represent using an analog copy protection system and using a split bust function through four lines. At this point, a value of the aps_copy_control_info field may be 0x3. In a specific embodiment, the aps_copy_control_info field may be a 2-bit field.

The emi_copy_control_info field may represent encryption mode indicator information representing whether to allow the copy of content. The emi_copy_control_info field may represent that the copy of content is not limited. At this point, a value of the emi_copy_control_info field may be 0x0. The emi_copy_control_info field may represent that an additional copy of content is not allowed. At this point, a value of the emi_copy_control_info field may be 0x1. The emi_copy_control_info field may represent that only one copy of content is allowed. At this point, a value of the emi_copy_control_info field may be 0x2. The emi_copy_control_info field may represent that the copy of content is prohibited. At this point, a value of the emi_copy_control_info field may be 0x3. In a specific embodiment, the emi_copy_control_info field may be a 2-bit field.

The ict_copy_control_info field represents image constrained trigger information representing whether to limit the quality of an analog output image of content. The ict_copy_control_info field may represent that the quality constraint of an image is not applied. At this point, a value of the ict_copy_control_info field may be 0x0. The ict_copy_control_info field may represent that the quality of an image is limited. At this point, a value of the ict_copy_control_info field may be 0x1. In a specific embodiment, the ict_copy_control_info field may be a 1-bit field.

The rct_copy_control_info field represents redistribution control information representing whether to allow the redistribution of broadcast content. The rct_copy_control_info field may represent that the redistribution control is not applied. At this point, a value of the rct_copy_control_info field may be 0x0. The rct_copy_control_info field may represent that the redistribution control is applied. At this point, a value of the rct_copy_control_info field may be 0x1.

The dot_copy_control_info field represents digital only token information representing whether to prohibit the analog output of content. The dot_copy_control_info field may represent that the analog output of content is not prohibited. At this point, a value of the dot_copy_control_info field may be 0x0. The dot_copy_control_info field may represent that the analog output of content is prohibited. At this point, a value of the dot_copy_control_info field may be 0x1. In a specific embodiment, the dot_copy_control_info field may be a 1-bit field.

Additionally, the rl_copy_control_info field represents retention period information representing the maximum retention period of record or time-shift content. The rl_copy_control_info field may represent that the retention period of broadcast content is 90 min. At this point, a value of the rl_copy_control_info field may be 0x0. The rl_copy_control_info field may represent that the retention period of broadcast content is 6 hr. At this point, a value of the rl_copy_control_info field may be 0x1. The rl_copy_control_info field may represent that the retention period of broadcast content is 12 hr. At this point, a value of the rl_copy_control_info field may be 0x2. The rl_copy_control_info field may represent that the retention period of broadcast content is one of 1 day to 252 days. At this point, a value of the rl_copy_control_info field may be one value of 0x03 to 0xFE. The rl_copy_control_info field may represent that the retention period of broadcast content is not limited. At this point, a value of the rl_copy_control_info field may be 0xFF. In a specific embodiment, the rl_copy_control_info field may be a 10-bit field.

The trick_mode_control_info field represents trick mode control information representing whether a trick mode for content is limited. The trick_mode_control_info field may represent that the trick mode for content is not limited. At this point, a value of the trick_mode_control_info field may be 0x0. The trick_mode_control_info field may represent that the trick mode for content is not limited. At this point, a value of the trick_mode_control_info field may be 0x1. In a specific embodiment, the trick_mode_control_info field may be a 1-bit field.

When broadcast service is changed or one event is terminated and a new event starts, URI may not be received. In such a case, a default URI information value is used. This will be described with reference to FIG. 9.

FIG. 9 shows the default value of URI according to another embodiment.

A default value of the protocol_version field may represent that a URI protocol version is 3. At this point, the default value of the protocol_version field may be 0x03.

The default value of the emi_copy_control_info field may represent that the copy of content is prohibited. At this point, the default value of the emi_copy_control_info field may be 0x3.

A default value of the aps_copy_control_info field may represent not using an analog copy protection system. At this point, the value of the aps_copy_control_info field may be 0x0.

A default value of the ict_copy_control_info field may represent that the quality constraint of an image is not applied. At this point, the default value of the ict_copy_control_info field may be 0x0.

The default value of the rct_copy_control_info field may represent that the redistribution control is not applied. At this point, the default value of the rct_copy_control_info field may be 0x0.

The dot_copy_control_info field may represent that the analog output is not prohibited. At this point, a default value of the dot_copy_control_info field may be 0x0.

The default value of the rl_copy_control_info field may represent that the retention period of broadcast content is min. At this point, the default value of the rct_copy_control_info field may be 0x0.

The default value of the trick_mode_control_info field may represent that the trick mode for content is not limited. At this point, the default value of the trick_mode_control_info field may be 0x0.

Broadcast content providers or distributors may manage the usage of content through the embodiments of FIGS. 8 and 9. However, the URI in the embodiments of FIGS. 8 and 9 allows only one copy or does not limit the copy of content, so that the management for the number of copying broadcast content is limited excessively. Accordingly, a method of managing the number of copying broadcast content through broadcast content providers or distributors is required. Accordingly, the URI may be required to include broadcast content copy number information representing the number of copying content. Especially, the URI may be required to include broadcast content copy number information representing the number of copying content, which is used for clearly managing the number of copying. This will be described with reference to the following drawings.

FIG. 10 shows the syntax of URI according to another embodiment.

The URI may include information for playing scrambled content by the broadcast reception device 100 and a plurality of devices, in a separate field. In a particular embodiment, URI syntax may include information on the number of devices that may play scrambled content. The information on the number of devices that may play scrambled content may be a numerical_output_control_info field. In a particular embodiment, the numerical_output_control_info field may be four bits. A value that the information on the number of devices that may play scrambled content may have is described through FIG. 11.

FIG. 11 shows a value that information on the number of devices that may play scrambled content may have according to another embodiment.

The information on the number of devices that may play scrambled content may represent that it is difficult to play the scrambled content by additional devices simultaneously with the broadcast reception device 100. In other words, the information on the number of devices that may play scrambled content may represent that it is possible to play the scrambled content by only the broadcast reception device 100. In this case, the value of the numerical_output_control_info field may be 0x0.

Also, the information on the number of devices that may play scrambled content may represent that it is possible to play the scrambled content by one additional device simultaneously with the broadcast reception device 100. In other words, the information on the number of devices that may play scrambled content may represent that it is possible to play the scrambled content by only the broadcast reception device 100 and another device. In this case, the value of the numerical_output_control_info field may be 0x01.

Also, the information on the number of devices that may play scrambled content may represent the number of devices that may play scrambled content. For example, devices corresponding to a value that the information on the number of devices that may play scrambled content may represent may play scrambled content simultaneously with the broadcast reception device 100.

Also, the information on the number of devices that may play scrambled content may represent that the number of devices playing scrambled content simultaneously with the broadcast reception device 100 is not limited. In this case, the value of the numerical_output_control_info field may have a maximum value that the bit of the field may represent. For example, the value of the numerical_output_control_info field may be 0xF. The default value of the information on the number of devices that may play scrambled content is described through FIG. 12.

FIG. 12 shows the default value of information that URI includes according to another embodiment.

As shown in FIG. 12, the default value of information that URI includes may represent that playback is not permitted by an additional device excluding the broadcast reception device 100. In this case, the default value of the numerical_output_control_info field may be 0x0.

In another embodiment, a resource for content control may include an object including information that enables scrambled content to be played by the broadcast reception device 100 and other devices. A particular embodiment is described below.

FIG. 13 shows an object that a resource for content control includes according to another embodiment.

As shown in FIG. 13, the resource for content control may include an object for representing the number of devices that may play scrambled content.

In an embodiment, the resource for content control may include an object for requesting the number of devices that may play scrambled content simultaneously with the broadcast reception device 100. In this case, the object for requesting the number of devices that may play scrambled content may be transmitted/received through a data unit including a cc_output_capability_req tag.

In another embodiment, the resource for content control may include an object for a reply to a request for the number of devices that may play scrambled content. In this case, the object for the reply to the request for the number of devices that may play scrambled content may be transmitted/received through a data unit including a cc_output_capability_reply tag.

FIGS. 14 and 15 show the syntax of a data unit according to an embodiment of FIG. 13.

FIG. 14 shows the syntax of a data unit for requesting the number of devices that may play scrambled content simultaneously with the broadcast reception device 100. As shown in FIG. 14, the syntax of a data unit for requesting the number of devices may include tag information for data unit identification. In this case, the tag information for data unit identification may be tag information for representing that a data unit is a data unit for a request for the number of devices. The tag information for data unit identification may be a cc_output_capability_req_tag field. In a particular embodiment, the cc_output_capability_req_tag field may be 24 bits.

Also, the syntax for the request for the number of devices that may play scrambled content may include total length information on a data field in a data unit.

FIG. 15 shows the syntax of a data unit for a reply to a request for the number of devices that may play scrambled content simultaneously with the broadcast reception device 100. As shown in FIG. 15, the syntax of the data unit for the reply to the request for the number of devices may include tag information for data unit identification. In this case, the tag information for data unit identification may be tag information for representing that a data unit is a data unit for the replay to the request for the number of devices. The tag information for data unit identification may be a cc_output_capability_reply_tag field. In a particular embodiment, the cc_output_capability_req_tag field may be 24 bits.

Also, the syntax for the data unit for the reply to the request for the number of devices that may play scrambled content may include total length information on a data field in a data unit.

Also, the syntax for the data unit for the reply to the request for the number of devices that may play scrambled content may include information on the number of devices that may play scrambled content. The information on the number of devices that may play scrambled content may be a numerical_output field. In a particular embodiment, the numerical_output field may be eight bits. For example, when the numerical_output field has a value of 0x00, the numerical-output field may represent that there is no device that may play scrambled content simultaneously with the broadcast reception device 100. For another example, when the numerical_output field has a value of 0xFF, the numerical-output field may represent that there is no limitation on devices that may play scrambled content simultaneously with the broadcast reception device 100. For another example, the numerical-output field may represent that a device corresponding to a value that the numerical-output field has may play scrambled content simultaneously with the broadcast reception device 100.

Figure 16:
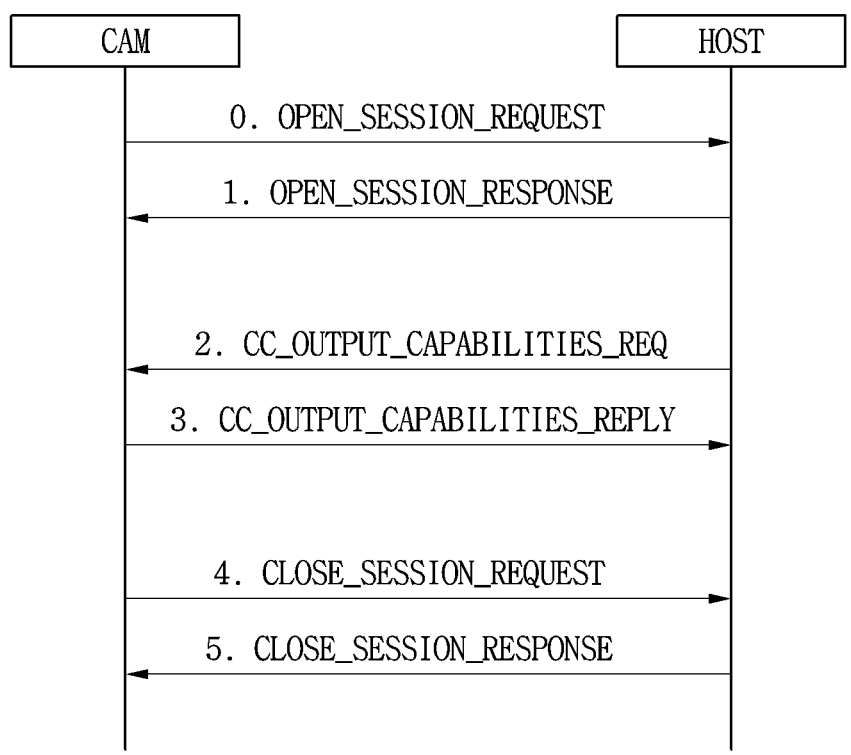
FIG. 16 shows a process of transmitting and receiving a data unit between a broadcast reception device and a CAM according to embodiments of FIGS. 13 to 15.

FIG. 16 shows a process of transmitting and receiving a data unit between a broadcast reception device and a CAM according to embodiments of FIGS. 13 to 15.

As shown in FIG. 16, the CAM 200 transmits a data unit for requesting a session open to the broadcast reception device HOST 100. In order for the CAM 200 to use the content control resource of the broadcast reception device 100, a session needs to be opened. Thus, the CAM 200 requests the session open for the transmission/reception of the content control resource, from the broadcast reception device 100.

The broadcast reception device 100 transmits a data unit for a replay for the request for the session open from the CAM 200. The session for the transmission/reception of the content control resource is opened through transmission of the replay by the broadcast reception device 100.

When the session is opened, the broadcast reception device 100 transmits, to the CAM 200, a data unit for requesting information on the number of devices that may play scrambled content simultaneously with the broadcast reception device 100. In this case, the data unit transmitted by the broadcast reception device 100 may be a data unit according to the syntax of FIG. 14.

The CAM 200 transmits, to the broadcast reception device 100, the data unit for a reply to the request for the number of devices that may play scrambled content. In this case, the data unit transmitted by the broadcast reception device 200 may be a data unit according to the syntax of FIG. 15.

The CAM 200 transmits a data unit for a request for a session close to the broadcast reception device 100. In this case, the request for the session close may also be transmitted by the broadcast reception device 100.

The broadcast reception device 100 transmits, to the CAM 200, a data unit for a replay for the request for the session close. In this case, the replay to the request for the session close may also be transmitted by the CAM 200.

In another embodiment, a protocol for the transmission and reception of a message including information on the number of devices that play scrambled content simultaneously with the broadcast reception device 100. A particular embodiment is described below.

FIGS. 17 and 18 show a protocol for transmitting information on the number of devices that play scrambled content according to an embodiment.

A protocol according to an embodiment may be a protocol for transmitting/receiving a message for information transmission. In this case, the message may be a message that is transmitted/received through a secure authentication channel (SAC). In other words, the message may be encrypted. Also, the message may be authenticated.

As shown in FIGS. 17 and 18, the protocol for information on the number of devices that play scrambled content may be identified through a data type. For example, the data type identifier of the protocol for information on the number of devices that play scrambled content may be 51.

As shown in FIG. 17, the protocol for information on the number of devices that play scrambled content may have two steps. In a first step, the broadcast reception device 100 requests, from the CAM 200, information on the number of devices that play scrambled content simultaneously with the broadcast reception device 100. In a second step, the CAM 200 transmits, to the broadcast reception device 100, information on the number of devices that play scrambled content simultaneously with the broadcast reception device 100.

Figure 19:
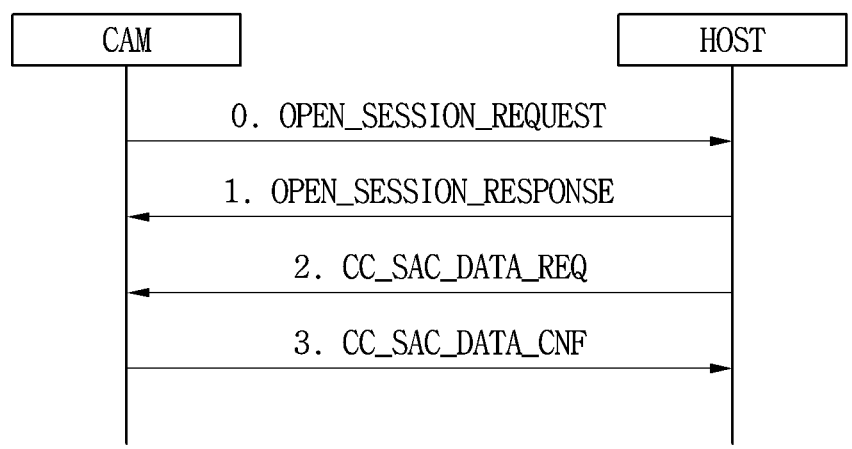

FIGS. 19 to 21 show a protocol for information on the number of devices that play scrambled content according to an embodiment.

As shown in FIG. 19, the broadcast reception device 100 and the CAM 200 transmit/receive a data unit for a session open. Since a process of opening a session has been described above, its detailed description is omitted.

When the session is opened, the broadcast reception device 100 transmits a data unit for requesting information the number of additional devices that may play scrambled content simultaneously with the broadcast reception device 100. In this case, the transmitted data unit may include information representing a data unit that conforms to a protocol for information on the number of devices that play scrambled content. A data unit conforming to a protocol defined in an embodiment is described with reference to FIG. 20.

As shown in FIG. 20, the syntax of a data unit requesting information on the number of additional devices that may play scrambled content simultaneously with the broadcast reception device 100 may include tag information. In this case, the tag information may be a cc_sac_data_req_tag field. Also, the syntax of the data unit requesting information on the number of additional devices that may play scrambled content simultaneously with the broadcast reception device 100 may include length information on a data field in a data unit. Also, the syntax of the data unit requesting information on the number of additional devices that may play scrambled content simultaneously with the broadcast reception device 100 may include a message transmitted through a SAC. In this case, the message transmitted through the SAC may be a sac_message field.

In particular, the message transmitted through the SAC may include information representing a message conforming to the protocol for information on the number of devices that play scrambled content. In this case, the information representing the message conforming to the protocol for information on the number of devices that play scrambled content may be a datatype_id field. For example, the datatype_id field may be 51.

Refer back to FIG. 19.

The CAM 200 transmits a data unit that replies to the request for information on the number of devices that play scrambled content. In this case, the transmitted data unit may include information representing a data unit that conforms to a protocol for information on the number of devices that play scrambled content. A data unit conforming to a protocol defined in an embodiment is described with reference to FIG. 21.

As shown in FIG. 21, the syntax of a data unit requesting information on the number of additional devices that may play scrambled content simultaneously with the broadcast reception device 100 may include tag information. In this case, the tag information may be a cc_sac_data_cnf_tag field. Also, the syntax of the data unit requesting information on the number of additional devices that may play scrambled content simultaneously with the broadcast reception device 100 may include length information on a data field in a data unit. Also, the syntax of the data unit requesting information on the number of additional devices that may play scrambled content simultaneously with the broadcast reception device 100 may include a message transmitted through a SAC. In this case, the message transmitted through the SAC may be a sac_message field.

In particular, the message transmitted through the SAC may include information representing a message conforming to the protocol for information on the number of devices that play scrambled content. In this case, the information representing the message conforming to the protocol for information on the number of devices that play scrambled content may be a datatype_id field. For example, the datatype_id field may be 51.

Figure 22:
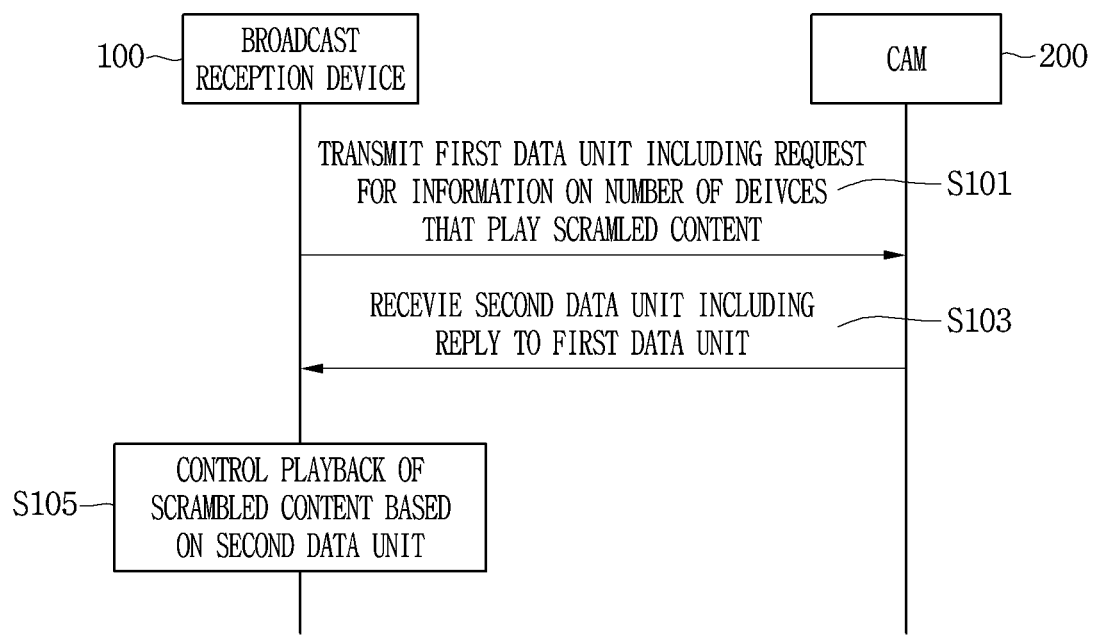
FIG. 22 is a flowchart of the operation of the broadcast reception device 100 according to an embodiment.

FIG. 22 is a flowchart of the operation of the broadcast reception device 100 according to an embodiment.

The broadcast reception device 100 transmits a first data unit including a request for information on the number of devices that play scrambled content in step S101. In particular, the broadcast reception device 100 may transmit, to the CAM 200, a first data unit including the request for information on the number of devices that play scrambled content simultaneously with the broadcast reception device 100.

In an embodiment, the first data unit may be a data unit conforming on the protocol for information on the number of devices that play scrambled content. In particular, a protocol for the transmission/reception of the first data unit may be defined between the broadcast reception device 100 and the CAM 200. In addition, the broadcast reception device 100 may transmit, to the CAM 200, the first data unit conforming to the defined protocol.

In this case, the first data unit may include information that represents conforming to the protocol for information on the number of devices that play scrambled content. In particular, the first data unit may include data type identification datatype-id information. In addition, the first data unit may include a request for the number of devices that play scrambled content.

In another embodiment, the first data unit may include an object for information on the number of devices that play scrambled content. In particular, the first data unit may include tag information for an object for a request for information on the number of devices that play scrambled content.

In another embodiment, the first data unit may include URI for the request for information on the number of devices that play scrambled content.

The broadcast reception device 100 receives, from the CAM 200, a second data unit including a reply to the first data unit in step S103. In particular, the broadcast reception device 100 may receive, from the CAM 200, a second data unit including information on the number of devices that play scrambled content simultaneously with the broadcast reception device 100. In this case, scrambled content that the broadcast reception device 100 and another device connected to the broadcast reception device 100 play may be the same content. Also, scrambled content that the broadcast reception device 100 and another device connected to the broadcast reception device 100 play may be different content.

In an embodiment, information on the number of devices is set zero, when scrambled content that the broadcast reception device 100 and another device connected to the broadcast reception device 100 play may be the same content. In an embodiment, information on the number of devices is set one, when scrambled content that the broadcast reception device 100 and another device connected to the broadcast reception device 100 play may be the different content.

In an embodiment, the second data unit may be a data unit conforming on the protocol for information on the number of devices that play scrambled content. In particular, a protocol for the transmission/reception of the second data unit may be defined between the broadcast reception device 100 and the CAM 200. In addition, the broadcast reception device 100 may receive, to the CAM 200, the second data unit conforming to the defined protocol.

In this case, the second data unit may include information that represents conforming to the protocol for information on the number of devices that play scrambled content. In particular, the second data unit may include data type identification datatype-id information. In addition, the second data unit may include the number of devices that play scrambled content.

In another embodiment, the second data unit may include an object for information on the number of devices that play scrambled content. In particular, the second data unit may include tag information for an object for a replay to a request for information on the number of devices that play scrambled content. The replay to the request for information on the number of devices may include at least one of information representing that only the broadcast reception device plays scrambled content, information representing that one or more limited devices play scrambled content, information representing that there is no limitation on the playback of scrambled content.

In another embodiment, the second data unit may include an URI message for the replay to the request for information on the number of devices that play scrambled content. In this case, the URI message may include at least one of information representing that only the broadcast reception device 100 plays scrambled content, information representing that one or more limited devices play scrambled content, information representing that there is no limitation on the playback of scrambled content.

The broadcast reception device 100 controls the playback of scrambled content based on the received second data unit, in step S105. In particular, the broadcast reception device 100 extracts, from the second data unit, information on the number of devices that play scrambled content. In addition, the broadcast reception device 100 outputs scrambled content based on the extracted information. In this case, the scrambled content output by the broadcast reception device 100 may be the same as content that the broadcast reception device 100 plays. Also, the scrambled content output by the broadcast reception device 100 may be different from content that the broadcast reception device 100 plays.

In a particular embodiment, the broadcast reception device 100 may also ignore a content request from another device connected thereto based on the second data unit. For example, there may be a case where information on the number of devices received from the CAM 200 is three and the number of devices that are currently connected to the broadcast reception device 100 and play scrambled content is three. In this case, the broadcast reception device 100 may ignore an additional scrambled content playback request from another device.

In another embodiment, the broadcast reception device 100 may re-adjust the output of scrambled content when changed information on the number of devices is received from the CAM during the output of scrambled content. For example, there may be a case where the number of devices that are currently connected to the broadcast reception device 100 and play scrambled content is three. In this case, when information on the number of devices received by the broadcast reception device 100 from the CAM is two, the broadcast reception device may stop outputting scrambled content to any one of three devices.

A broadcast reception device, an operating method of a broadcast reception device, a CAM and an operating method of a CAM according to embodiments may control the number of external devices that play scrambled content simultaneously with the broadcast reception device.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may vary. In addition, it should be construed that differences related to such a variation and such an application are included in the scope of the present disclosure defined in the following claims.

What is claimed is:

1. A broadcast reception device connected to a conditional access module (CAM) descrambling scrambled broadcast content, the broadcast reception device comprising:
    a broadcast receiver configured to receive a broadcast signal comprising scrambled content; and
    a controller configured to transmit a first data unit and receive a second data unit,
    wherein the first data unit comprises a request for information on the number of devices that play the scrambled content simultaneously with the broadcast reception device and the second data unit comprises a reply to the first data unit.

2. The broadcast reception device according to claim 1, wherein the first data unit and the second data unit conform to a protocol for information on the number of devices that play the scrambled content simultaneously with the broadcast reception device.

3. The broadcast reception device according to claim 2, wherein the first data unit and the second data unit comprise information representing data units conforming to the protocol for information on the number of devices.

4. The broadcast reception device according to claim 3, wherein the second data unit comprises the number of devices that play scrambled content different from the scrambled content played by the broadcast reception device, simultaneously with the broadcast reception device.

5. The broadcast reception device according to claim 1, wherein messages for information transmission in the first data unit and the second data unit are encrypted or authenticated messages.

6. The broadcast reception device according to claim 1, wherein the first data unit and the second data unit comprise objects for the information on the number of devices that play the scrambled content simultaneously with the broadcast reception device.

7. The broadcast reception device according to claim 6, wherein the information on the number of devices that play the scrambled content that is comprised in the second data unit is at least one of information representing that only the broadcast reception device plays scrambled content, information representing that one or more limited devices play scrambled content, and information representing that there is no limitation on the playback of scrambled content.

8. The broadcast reception device according to claim 1, wherein the first data unit comprises usage rule information (URI) for a request for information on the number of devices that play the scrambled content simultaneously with the broadcast reception device, and
    the second data unit comprises a URI message for a reply to the request for the information on the number of devices that play the scrambled content simultaneously with the broadcast reception device.

9. The broadcast reception device according to claim 8, wherein the URI message includes at least one of information representing that only the broadcast reception device plays the scrambled content, information representing that one or more limited devices play the scrambled content, and information representing that there is no limitation on the playback of the scrambled content.

10. The broadcast reception device according to claim 1, wherein the controller transmits and receives to and from the CAM a third data unit for a session open for transmitting/receiving the first data unit and the second data unit.

11. An operating method of a broadcast reception device connected to a conditional access module (CAM) descrambling scrambled broadcast content, the operating method comprising:
    receiving a broadcast signal comprising scrambled content;
    transmitting a first data unit comprising a request for information on the number of devices that play the scrambled content simultaneously with the broadcast reception device; and
    receiving a second data unit comprising a reply to the first data unit.

12. The operating method according to claim 11, wherein the first data unit and the second data unit conform to a protocol for information on the number of devices that play the scrambled content simultaneously with the broadcast reception device.

13. The operating method according to claim 12, wherein the first data unit and the second data unit comprise information representing data units conforming to the protocol for information on the number of devices.

14. The operating method according to claim 11, wherein the second data unit comprises the number of devices that play scrambled content simultaneously with the broadcast reception device, and
    wherein the scrambled content is different from the scrambled content that the reception device plays.

15. The operating method according to claim 11, wherein messages for information transmission in the first data unit and the second data unit are encrypted or authenticated messages.

16. The operating method according to claim 11, further comprising:
   playing scrambled content by a device connected to the broadcast reception device based on the second data unit.

17. The operating method according to claim 11, wherein the first data unit and the second data unit comprise objects for the information on the number of devices that play the scrambled content simultaneously with the broadcast reception device.

18. The operating method according to claim 11, wherein the first data unit comprises usage rule information (URI) for a request for information on the number of devices that play scrambled content simultaneously with the broadcast reception device, and
   the second data unit comprises an URI message for a reply to the request for the information on the number of devices that play scrambled content simultaneously with the broadcast reception device.

19. The operating method according to claim 11, further comprising transmitting and receiving to and from the CAM a third data unit for a session open for transmitting/receiving the first data unit and the second data unit.

* * * * *